US008068719B2

(12) United States Patent
Chen (10) Patent No.: US 8,068,719 B2
(45) Date of Patent: Nov. 29, 2011

(54) SYSTEMS AND METHODS FOR DETECTING EXCITING SCENES IN SPORTS VIDEO

(75) Inventor: Ming-Jun Chen, Tai-Nan (TW)

(73) Assignee: Cyberlink Corp., Shindian, Taipei (TW)

( * ) Notice: Subject to any disclaimer, the term of this patent is extended or adjusted under 35 U.S.C. 154(b) by 1376 days.

(21) Appl. No.: 11/408,313

(22) Filed: Apr. 21, 2006

(65) Prior Publication Data

US 2007/0248327 A1 Oct. 25, 2007

(51) Int. Cl.
*G11B 27/00* (2006.01)
*J04N 5/93* (2006.01)
*H04N 9/80* (2006.01)
*H04N 11/04* (2006.01)
*H04N 11/00* (2006.01)
*H04N 7/00* (2006.01)
*H04N 9/475* (2006.01)
*G11B 7/085* (2006.01)
*G11B 21/08* (2006.01)
*G11B 27/02* (2006.01)
*H04N 5/76* (2006.01)
*H04N 7/12* (2006.01)
*H04N 11/02* (2006.01)

(52) U.S. Cl. ........ 386/278; 386/280; 386/281; 386/285; 386/239; 386/248; 369/30.05; 369/30.19; 369/47.13; 369/83; 348/231.4; 348/423.1; 348/462; 348/515

(58) Field of Classification Search .................... 386/39, 386/54, 55, 75, 96, 104, 278, 280, 281, 285, 386/239, 248; 369/1, 2, 30.05, 30.19, 47.13, 369/83; 348/231.14, 423.1, 462, 515
See application file for complete search history.

(56) References Cited

U.S. PATENT DOCUMENTS

| | | | |
|---|---|---|---|
| 5,918,223 A | 6/1999 | Blum et al. | |
| 6,889,191 B2 * | 5/2005 | Rodriguez et al. | 704/275 |
| 7,142,250 B1 * | 11/2006 | Black | 348/515 |
| 2003/0202007 A1 * | 10/2003 | Silverstein et al. | 345/730 |
| 2004/0200337 A1 | 10/2004 | Abe et al. | |
| 2005/0159956 A1 | 7/2005 | Rui et al. | |
| 2005/0160457 A1 * | 7/2005 | Rui et al. | 725/45 |

FOREIGN PATENT DOCUMENTS

| | | |
|---|---|---|
| DE | 195 05 435 C1 | 12/1995 |
| EP | 1 542 206 A | 6/2005 |
| WO | WO 02/073592 A2 | 9/2002 |

OTHER PUBLICATIONS

Wold E et al. "Content-based classification, search, and retrieval of audio", IEEE Multimedia, IEEE Service Center, vol. 3, No. 3, 1996, pp. 27-36.

* cited by examiner

*Primary Examiner* — Thai Tran
*Assistant Examiner* — Daquan Zhao
(74) *Attorney, Agent, or Firm* — Thomas, Kayden, Horstemeyer & Risley, LLP (57) ABSTRACT

Disclosed are systems and methods for identifying a scene in a video or audio source containing sports content. A representative method includes: extracting audio data from a video source, the video source containing sports content, removing from the audio data sounds not producible by human, classifying scenes of the video source as important scenes of the video clip by analyzing the energy, pitch and tonality of at least one frame of the audio data and determining whether the at least one frame is an exciting scene.

33 Claims, 5 Drawing Sheets

FIG. 1

COMPUTER READABLE MEDIUM

LOGIC TO SPLIT AUDIO DATA FROM VIDEO SOURCE CONTAINING SPORTS CONTENT  202

LOGIC TO FILTER SOUNDS OUTSIDE OF HUMAN FREQUENCY RANGE FROM AUDIO DATA  204

LOGIC TO IDENTIFY EXCITING SCENES BY ANALYZING PITCH, ENERGY, AND TONALITY OF FILTERED AUDIO DATA  206

LOGIC TO GENERATE META DATA IDENTIFYING EXCITING SCENES OF THE VIDEO SOURCE CONTAINING SPORTS CONTENT  208

COMPUTER READABLE MEDIUM

LOGIC TO SPLIT AUDIO DATA FROM VIDEO SOURCE CONTAINING SPORTS CONTENT _222_

LOGIC TO IDENTIFY EXCITING SCENES BY ANALYZING PITCH, ENERGY, AND TONALITY OF AUDIO DATA _224_

LOGIC TO GENERATE META DATA IDENTIFYING EXCITING SCENES OF THE VIDEO SOURCE CONTAINING SPORTS CONTENT _226_

SYSTEMS AND METHODS FOR DETECTING EXCITING SCENES IN SPORTS VIDEO

TECHNICAL FIELD

The present invention disclosure is generally related to audio/video processing and, more particularly, is related to systems, methods, and computer readable media having programs for detecting exciting scenes in sports audio/video.

BACKGROUND

Video content is a form of multimedia that is increasingly viewed and manipulated by consumers. With the proliferation of sports related programming and live or delayed sports event programming, consumers have the ability and option to consume an increasing amount of sports video programming. The vast amount of sports related programming available to consumers could render it difficult for consumers to consume all desirable content. Also, many devices and services available in the marketplace allow consumers to record, time-shift or view on-demand video and audio content. These devices and/or services can allow a consumer to enjoy such content, particularly sports related programming, at a time other than their initial broadcast or delivery. Such devices and/or services can also allow a consumer to fast-forward or rewind programming which enables quicker viewing of the content or replay of certain scenes contained within the content.

Unfortunately, many consumers have neither the time nor inclination to view all such content in its entirety. Many sporting events are broadcast or delivered in a primarily unedited form. That is, such content is typically not edited for brevity or even delivered with important or eventful scenes tagged or noted for their importance in a manner that allows consumers to quickly view important scenes or a summarized version of the programming.

Frequently, consumers are inclined to fast-forward recorded or on-demand sports-related programming to view the programming in a shorter period of time than its original live running time. However, simply fast-forwarding through a televised sporting event, for example, renders it difficult for a consumer to view scenes or events in the programming that he/she may find exciting or important. For example, a soccer match may contain only a few instances of a goal being scored or a few impressive non-goal events. A consumer may miss such scenes in a recorded or on-demand sporting event if he/she is viewing the event and attempting to shorten the amount of time to view the event by simply fast-forwarding. Further, simply fast-forwarding through a recorded or on-demand sporting event provides a consumer with a less than ideal viewing experience, particularly when saving time is a concern of the viewer.

SUMMARY

Embodiments of the present disclosure provide systems, methods and computer readable media for identifying a scene in a video source containing sports content. In one embodiment, a method includes the steps of: analyzing tonality of at least one frame of audio data of a video source containing sports content, and determining whether tonality of the at least one frame indicates that the at least one frame corresponds to an exciting scene of the video source.

In another embodiment, a computer readable medium having a program for identifying a scene in a video source containing sports content includes: logic configured to detect whether tonality of at least one frame of audio data of a video source containing sports indicates that the at least one frame of the audio data corresponds to an exciting scene of the video source.

Other systems, methods, and computer readable media will become apparent from the following drawings and detailed description.

DETAILED DESCRIPTION

Reference will now be made to the drawings. While the disclosure will be provided in connection with these drawings, there is no intent to limit the disclosure to the embodiment of embodiments disclosed herein. On the contrary, the intent is to cover all alternatives, modifications, and equivalents. Disclosed herein are systems and methods for identifying a scene within a video source containing sports content. More specifically, the invention relates to systems and methods for identifying important or exciting scenes within such video. As noted above, viewers of such video content often do not have the time or are not inclined to view sports programming in its entirety. Many consumers may desire to view an abbreviated version of such content or have the ability to easily summon or jump to important or exciting scenes to view "highlights" of a recorded or on-demand sporting event.

Figure 1:
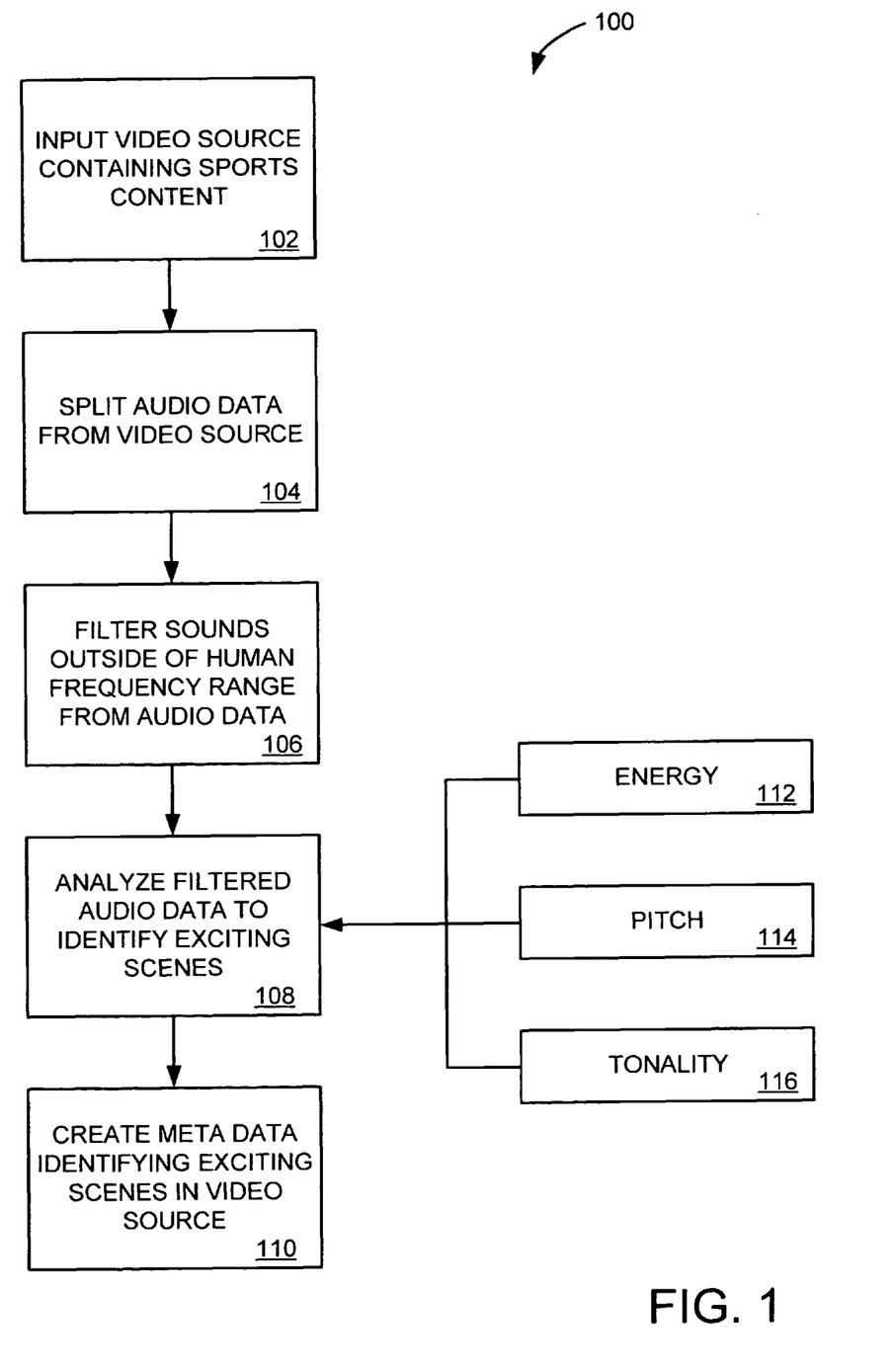
FIG. 1 is a flowchart illustrating an embodiment of identifying exciting scenes in a video source containing sports.

Reference is now made to FIG. 1, which depicts a flowchart illustrating an embodiment for detecting a scene in video source containing sports 100. A video source containing sports content is input in step 102. A video source consists of moving pictures multiplexed with corresponding audio and can be stored, broadcast or delivered in a variety of formats using a variety of methods known in the art. A video source containing sports content can include but is not limited to any video containing: football, soccer, auto racing, hockey, or other sports related or sports event programming. As is known in the art, sports programming is generally produced and delivered with an announcer audio component to enhance the viewing experience and inform the viewer about the event being televised. An announcer audio component generally comprises one or more human giving a verbal or audible description to the viewer of the event as well as other information including statistics, score, news and other information about a televised sporting event. An announcer audio component can also include one or more humans giving his/her opinions or expressing emotion regarding the event to the viewer or listener.

In block 104, audio data is split from a video source containing sports content for analysis. It would be appreciated that the audio data can be split from a video source in a variety of formats and using a variety of methods known in the art. Further, the audio data can be split and then converted to another format usable by digital computer systems. For example, the audio data corresponding to a video source may be digitized utilizing pulse code modulation (PCM) and/or stored as PCM data. Such PCM data can be easily manipulated by a computer system in digital form.

In block 106, sounds that fall outside of a frequency range of human producible sounds can be filtered from the audio data extracted from a video source containing sports content to create filtered audio data Sounds or noise outside the normal frequency range of human sounds can be filtered from the audio data to improve the potential accuracy of an analysis of the audio data. Human sounds can include, but are not limited to: a voice, cheer, applause, scream or any other sounds or noises producible by a human. Such sounds are typically produced by spectators and/or announcers in attendance at a sporting event and are frequently present in the audio data corresponding to a video source containing sports content. Sounds outside of the frequency range of typical human sounds can be filtered from the audio data in block 106 to improve the accuracy of results of an analysis to identify important or exciting scenes within a video source containing sports. Non-human sounds can be filtered using a variety of audio filtering methods based on the acoustical properties of such sounds, which are both known in the art.

In block 108, an analysis is performed on at least one frame of the filtered audio data to determine if the corresponding frame in the video source contains an exciting or important event or occurrence. Preferably, every frame within the audio data is subjected to this analysis to ensure accuracy of the identification of exciting scenes in the video source. The filtered audio data can be divided into frames of varying lengths, such as, for example, the length of a single video frame or multiples thereof. The filtered audio data containing primarily human sounds is analyzed to identify exciting scenes by determining energy 112, pitch 114, and tonality 116 of filtered audio data in each frame.

As is known in the art, the pitch of an audio sample relates to the frequency of the audio sample. Further, tonality, as is known in the art, is related to the perception or centering of an audio sample around a single frequency or pitch. In this regard, a higher tonality corresponds to an audio sample that is closer to pure tone, or a single frequency tone with little or no harmonic content or overtones because such a higher tonality corresponds to a greater perception that the audio sample centers around a single frequency. It would be appreciated that pure tone represents a tone that can be represented by a sinusoidal wave, whereas sound with little or no tonality, or white noise, can be represented by a flat wave or an audio sample that is flat across its entire spectrum.

Exciting scenes in a video source containing sports content are often accompanied by audio with identifiable pitch and energy characteristics. For example, the audience will often scream and applaud vigorously during a soccer match when a goal is scored. The pitch 114 of such audio can be predicted and a potentially exciting scene identified during analysis. Similarly, the energy 112 of such audio is generally high in relation to other portions of the audio data, and the differential in energy between exciting or important scenes in a video source containing sports and unexciting or unimportant scenes can be detected as a part of the analysis 108. Further, an announcer will often express emotion or scream when an exciting or important event occurs in a source video containing sports content so that he/she can relate the importance and excitement of the occurrence to a viewer or listener. Similarly, the pitch and energy of this announcer audio can be predicted and detected in block 108.

However, performing an analysis that incorporates only pitch and energy can yield less than ideal results when attempting to detect an exciting or important scene in a video source containing sports. Often, other background noises not eliminated from the audio data or other audio artifacts can lower the quality of the results in such an analysis. Analyzing audio data only on the basis of the energy can yield faulty results because high energy sounds may relate to a meaningless audience cheer or high energy background noise unrelated to the importance of a scene. An analysis of pitch alone can also yield inaccurate results because of difficulties in accurately detecting pitch relative to tonality and because of irrelevant background noise in the audio data. Therefore, in accordance with the disclosure, an analysis of tonality 116 is also included in the identification of an exciting scene 108. Loud and vigorous sounds emanating from an audience typically have a tonality approaching pure tone relative to non-vigorous audience noises. Therefore, an analysis of tonality of a frame of the filtered audio data can assist in the identification of exciting or important scenes in the video source. If the tonality of a frame of the filtered audio data approaches pure tone, then the corresponding frame of the video source is more likely to include an exciting or important scene.

Similarly, a scream or enthusiastic verbal expression of emotion by an announcer in a televised sporting event also has a tonality approaching pure tone when compared to typical verbal expressions of an announcer during the course of the event. As is known in the art, an announcer is more likely to scream or offer enthusiastic expressions of emotion during an exciting or important scene of sports programming. Therefore, preferably, an analysis of tonality 116 in combination with an analysis of pitch 112 and energy 114 of each frame of the filtered audio data can be used to identify exciting scenes.

Alternatively, the analysis 108 can be accomplished by analyzing tonality 116 of a plurality of frames and calculating an average tonality of the plurality of frames. If the average tonality of the plurality of frames exceeds a threshold tonality, then the corresponding frames or scenes of the video source can be identified as exciting or important scenes. Similarly, the above analysis 108 can be further refined by dividing a video source into a plurality of scenes, wherein a scene can comprise predetermined number of frames of the video source. Then, if tonality of a certain number of frames of the scene exceeds a threshold tonality, then the entire scene can be identified as an exciting or important scene. The predetermined number of frames can vary depending on the type of sports content within the video source or other factors that should be appreciated by a person of ordinary skill in the art. The certain number of frames can similarly vary based on factors that should be appreciated by a person of ordinary skill in the art.

As a non-limiting example, a video source can be divided into a plurality of scenes comprising a predefined number of frames. Then, if the audio data of a majority of frames of each scene possess a tonality exceeding a threshold tonality, then the entire scene comprising a predefined number of frames can be identified as an important or exciting scene. It should be appreciated that the above non-limiting example is only one example of an implementation of an analysis 108, and that other permutations of an analysis 108 can be conducted in accordance with the disclosure.

The analysis 108 can also be accomplished by detecting energy 112, pitch 114, and tonality 116 of each frame of the filtered audio data and assigning a corresponding confidence score to each frame accordingly. As a non-limiting example, a frame having a pitch corresponding to a scream of an announcer's voice, a high energy relative to other frames of the audio data, and a tonality approaching pure tone relative to other frames can be assigned a high confidence score that the frame contains an important or exciting scene of the sports content of the video source. This confidence score can relate to the probability that the frame corresponds to an exciting scene. This confidence score can be compared to that of other frames of the audio data to determine a set of important or exciting scenes.

For example, a predetermined number of important scenes to be identified can be delineated prior to analysis, and the number of frames with the highest confidence scores can be identified accordingly in step 110, where meta data identifying exciting and important scenes is created. Alternatively, the analysis can merely assign confidence scores to each frame of the filtered audio data, and a number of exciting scenes can be determined after analysis in step 110 during the creation of meta data identifying exciting scenes in the video source containing sports content, with the number of frames having the highest confidence scores identified within the meta data. As another non-limiting alternative, an abbreviated or summarized version of the video source can be dynamically generated by referencing the original video source, the meta data and the confidence scores generated during analysis.

Figure 2:
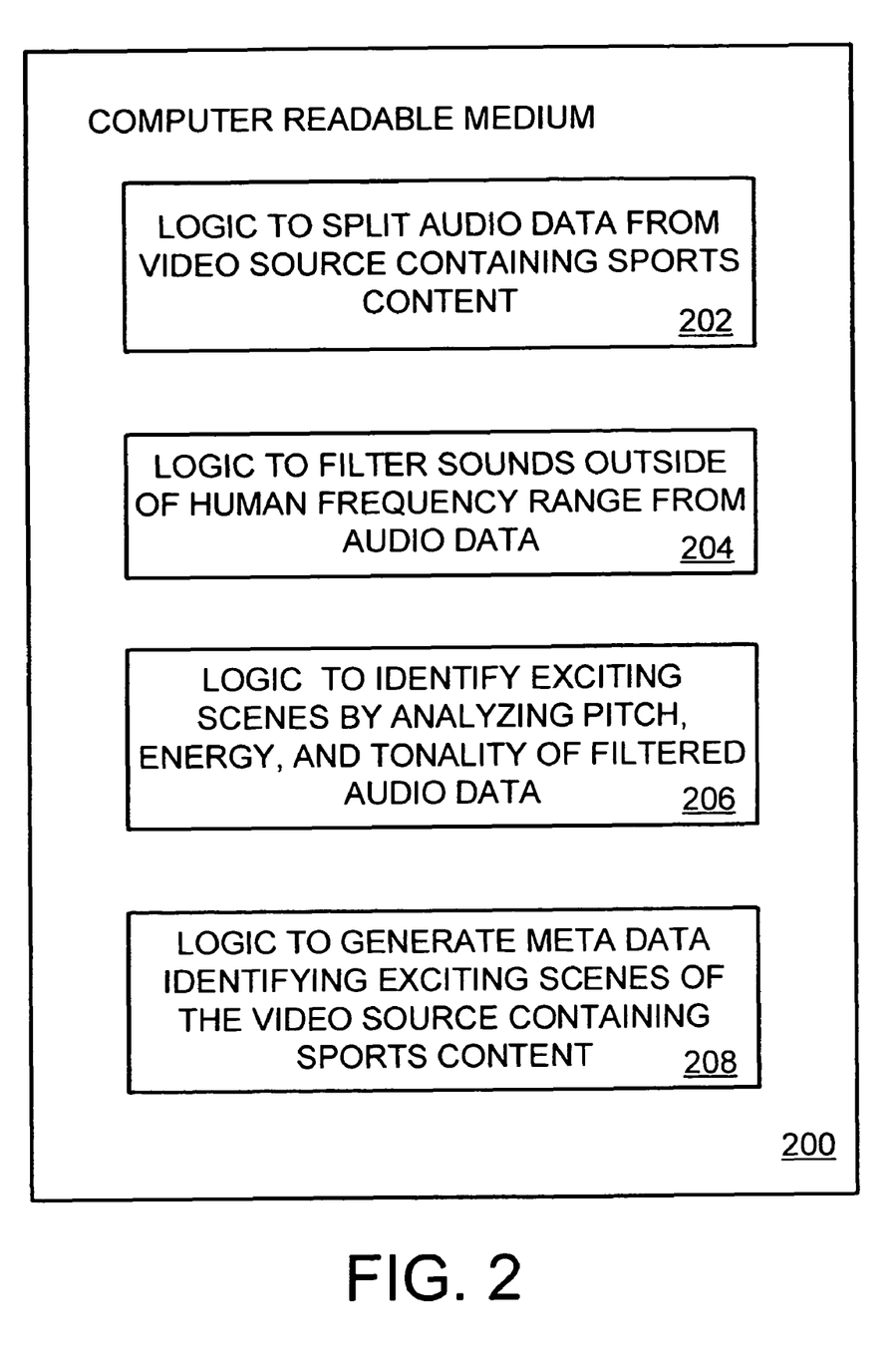
FIG. 2 is a block diagram illustrating an embodiment of a computer readable medium containing a program for identifying exciting scenes in a video source containing sports.

Reference is now made to FIG. 2, which illustrates an embodiment of a system for identifying a scene in a video source containing sports content. The system 200 includes logic to split audio data from a video source containing sports in block 202. The system 200 also includes logic to filter sounds outside of a frequency range of those typically produced by humans in block 204. The system 200 includes logic to identify exciting or important scenes in the video source by analyzing pitch, energy and tonality of the audio data in block 206. Preferably, the system 200 includes logic to identify exciting scenes by performing an analysis of each frame of audio in block 206. Finally, the system 200 includes logic to create meta data identifying important or exciting scenes of the video source containing sports content in block 208.

As noted above, sounds that fall outside of a frequency range of sounds typically produced by humans can be optionally filtered from the audio data. Human sounds can include, but are not limited to: a voice, cheer, applause, scream or any other sounds or noises producible by a human. Such sounds are typically produced by spectators and/or announcers in attendance at a sporting event and are frequently present in the audio data corresponding to a video source containing sports content. Non-human sounds or those that are outside a frequency range of sounds typically produced by humans are eliminated to create filtered audio data in block 206 to improve the accuracy of results of an analysis to identify important or exciting scenes within a video source containing sports.

The system further includes logic to identify important or exciting scenes in a video source or video clip containing sports content in block 206. As noted above, preferably, pitch, energy and tonality of each frame of the audio data can be detected in order to perform an analysis for determining exciting scenes. As a non-limiting example, a confidence score can be assigned to each frame of the filtered audio data, the confidence score related to the probability that the frame corresponds to an exciting or important scene of the video source.

Exciting scenes in a video source containing sports content are often accompanied by audio with identifiable pitch and energy characteristics. For example, an audience will often applaud or scream vigorously during a soccer match when a goal is scored. The pitch of such audio can be predicted and a potentially exciting scene identified during analysis. Similarly, the energy of such audio is generally high in relation to other portions of the filtered audio data, and the differential in energy between an exciting or important scenes in a source video containing sports and an unexciting or unimportant scene can be detected as a part of the analysis. Further, an announcer will often express emotion or scream when an exciting or important event occurs in a source video containing sports content. Similarly, the pitch and energy of this audio can be predicted and detected in block 206.

As mentioned above, however, performing such an analysis by analyzing only pitch and energy of the audio data has potential accuracy drawbacks. Therefore, in accordance with the invention, block 208 further includes logic to perform an analysis utilizing tonality of the filtered audio data. Vigorous audience noise has a tonality approaching pure tone relative to non-vigorous audience noises. Similarly, a scream of an announcer in a televised sporting event also has a tonality approaching pure tone relative to an announcer's voice that is calm or conversational. As is known in the art, the more vigorous audience noises or announcer descriptions are more likely to accompany an important or exciting scene of a video source containing sports content. Therefore, an analysis of tonality of a frame of the filtered audio data can assist in the identification of exciting or important scenes in the video source. If the tonality of a frame of the filtered audio data approaches pure tone, then the corresponding frame of the video source is more likely to include an exciting or important scene.

Figure 3:
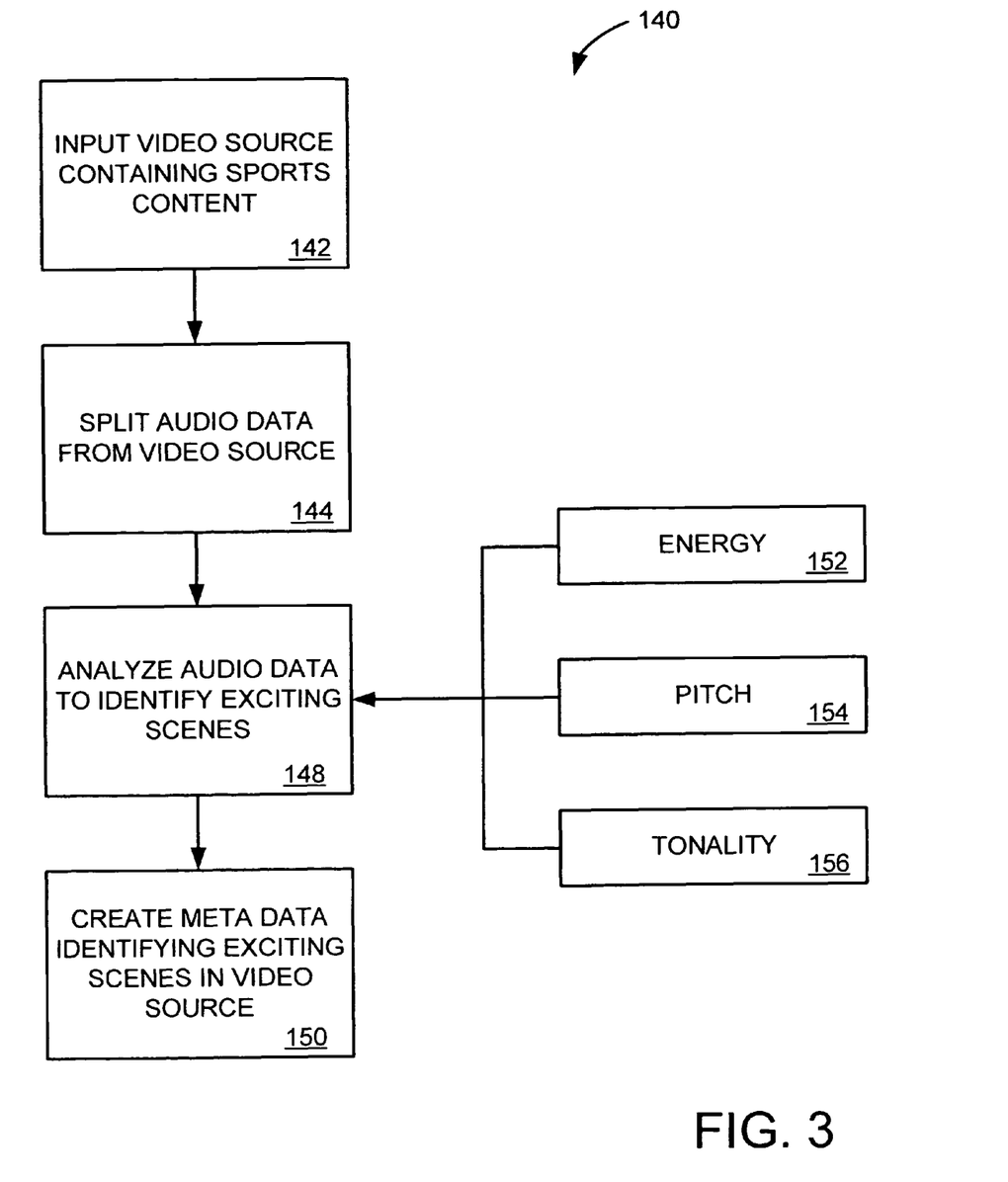
FIG. 3 is a flowchart illustrating an embodiment of identifying exciting scenes in a video source containing sports.

Reference is now made to FIG. 3, which depicts an embodiment of a method 140 for identifying an exciting scene in a video source containing sports content. The embodiment is similar to the method illustrated in the flowchart of FIG. 1. In block 142, a video source containing sports content is input. A video source consists of moving pictures multiplexed with corresponding audio and can be stored, broadcast or delivered in a variety of formats using a variety of methods known in the art. A video source containing sports content can include but is not limited to any video containing: football, soccer, auto racing, hockey, or other sports related or sports event programming. As is known in the art, sports programming is generally produced and delivered with an announcer audio component to enhance the viewing experience and inform the viewer about the event being televised. An announcer audio component generally comprises one or more human giving a verbal or audible description to the viewer of the event as well as other information including statistics, score, news and other information about a televised sporting event. An announcer audio component can also include one or more humans giving his/her opinions or expressing emotion regarding the event to the viewer or listener.

In block 144, audio data is split from a video source containing sports content for analysis. It would be appreciated that the audio data can be split from a video source in a variety of formats and using a variety of methods known in the art. Further, the audio data can be split and then converted to another format usable by digital computer systems. For example, the audio data corresponding to a video source may be digitized utilizing pulse code modulation (PCM) and/or stored as PCM data. Such PCM data can be easily manipulated by a computer system in digital form.

In block 148, an analysis is performed on at least one frame of the audio data to determine if the corresponding frame in the video source contains an exciting or important event or occurrence. Preferably, every frame within the audio data is subjected to this analysis to ensure accuracy of the identification of exciting scenes in the video source. The audio data can be divided into frames of varying lengths, such as, for example, the length of a single video frame or multiples thereof. The audio data containing primarily human sounds is analyzed to identify exciting scenes by determining energy 152, pitch 154, and tonality 156 of audio data in each frame. The audio data is analyzed in a manner similar to that of the method 100 disclosed above and exciting scenes can be detected and identified by performing an analysis of the above-mentioned attributes of the audio data.

Figure 4:
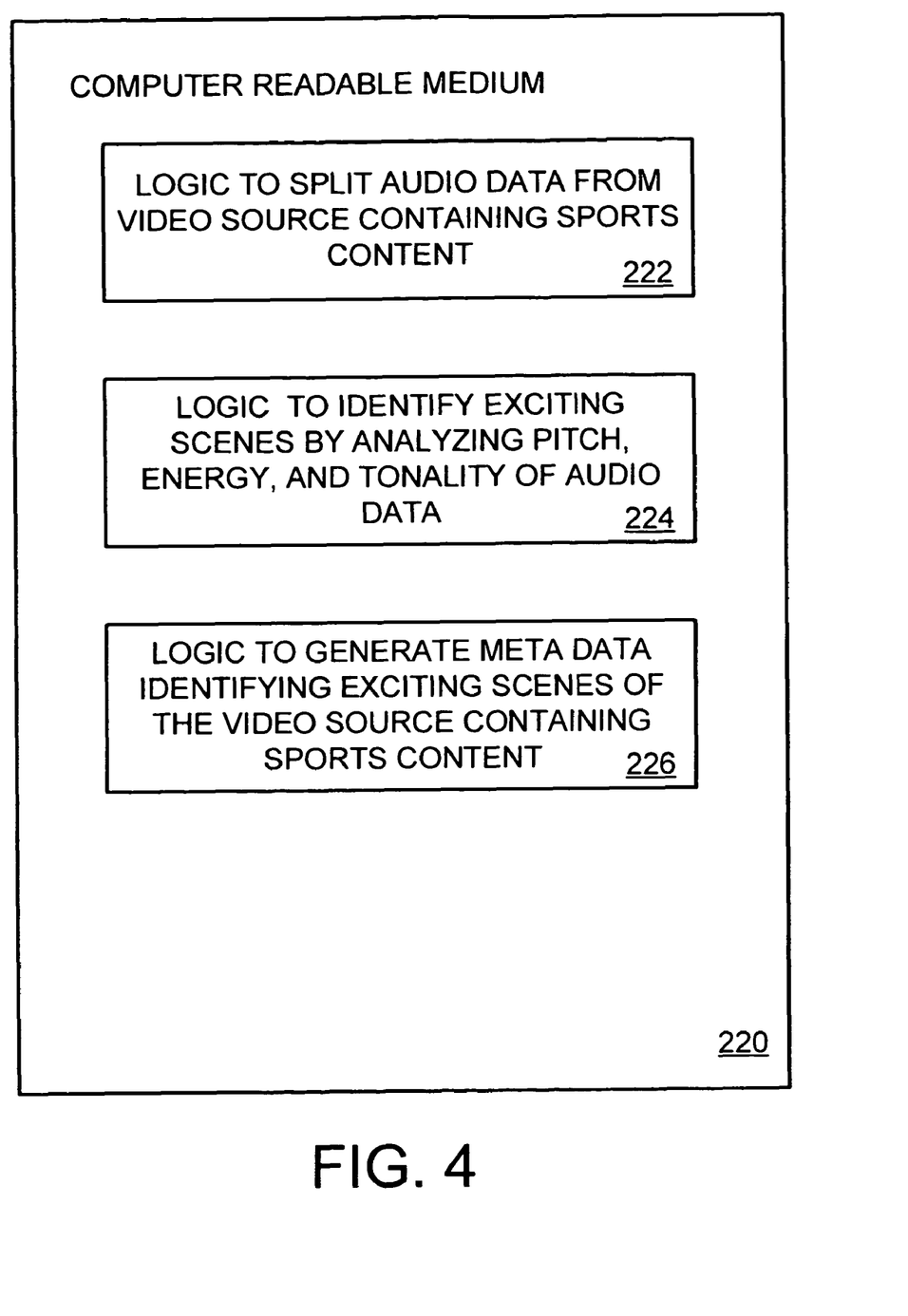
FIG. 4 is a block diagram illustrating an embodiment of a computer readable medium containing a program for identifying exciting scenes in a video source containing sports.

Reference is now made to FIG. 4, which illustrates an embodiment of a computer readable medium for identifying a scene in a video source containing sports content 220. The computer readable medium 320 includes logic configured to filter sounds from the audio source that fall outside a frequency range of sounds typically produced by humans. As noted above in reference to FIG. 2, the computer readable medium 220 includes logic to identify exciting scenes by analyzing, preferably frame-by-frame, pitch, energy and tonality of each frame to determine whether the frame contains sounds indicative of an exciting scene 224. Also, the computer readable medium contains logic to generate meta data identifying exciting or important scenes of a video source containing sports content 226.

Figure 5:
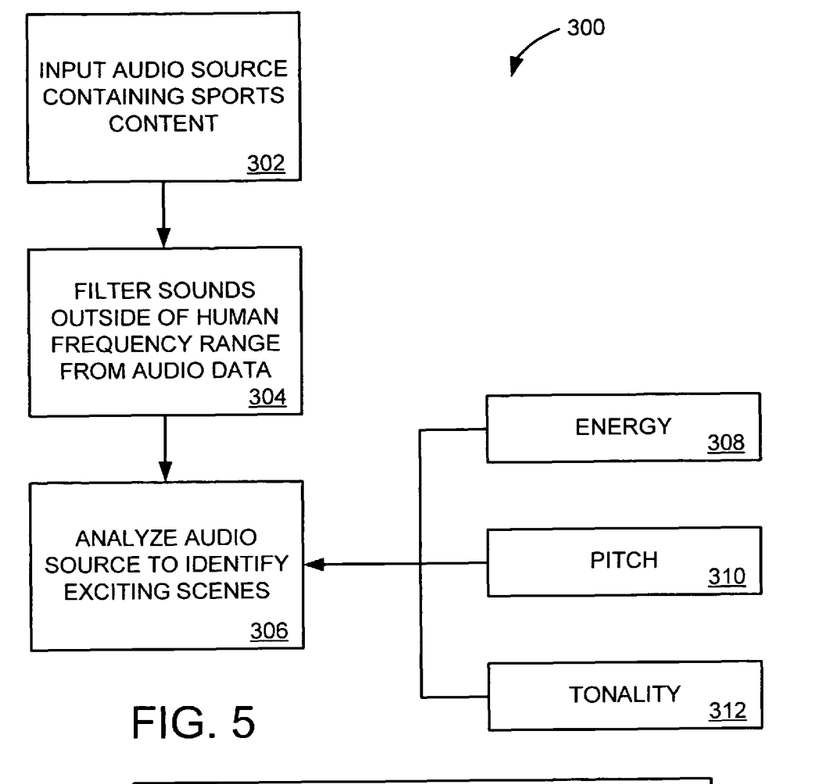
FIG. 5 is a flowchart illustrating an embodiment of identifying exciting scenes in an audio track containing sports content.

Reference is now made to FIG. 5, which depicts an embodiment of a method for identifying an exciting scene in an audio source containing sports content. An audio source can include, but is not limited to, audio extracted from a video source, audio delivered via radio, audio delivered via streaming internet audio, stored digital formats, such as MPEG-3 audio, downloadable audio broadcasts, and other audio storage and distribution formats. An audio source can be converted into a format usable by a digital computer system. For example, analog audio sources can be converted to a digital format using PCM or stored as PCM data, which is known in the art as a format for digitizing audio.

Exciting or important scenes can be identified in accordance with the method 300 depicted in FIG. 5, which is similar to the embodiment of FIG. 1. In block 302, an audio source containing sports content is input. In block 304, sounds not falling within a frequency range of sounds typically produced by humans can be optionally filtered to create filtered audio data in preparation for analysis. As noted above in reference to FIG. 1, non-human sounds or sounds falling outside of a frequency range of sounds typically produced by humans can impose analysis accuracy drawbacks when identifying exciting scenes of the audio source. In block 306, the audio source is analyzed, preferably frame by frame, utilizing energy 308, pitch 310, and tonality 312 of a frame to determine whether the frame corresponds to an exciting scene in the audio source. It should be appreciated that varying frame sizes can be chosen for analysis, such as, for example, a frame size corresponding to an audio sampling rate or multiples thereof. It should be apparent how the audio is analyzed in accordance with the embodiment in light of the above described method of FIG. 1.

Figure 6:
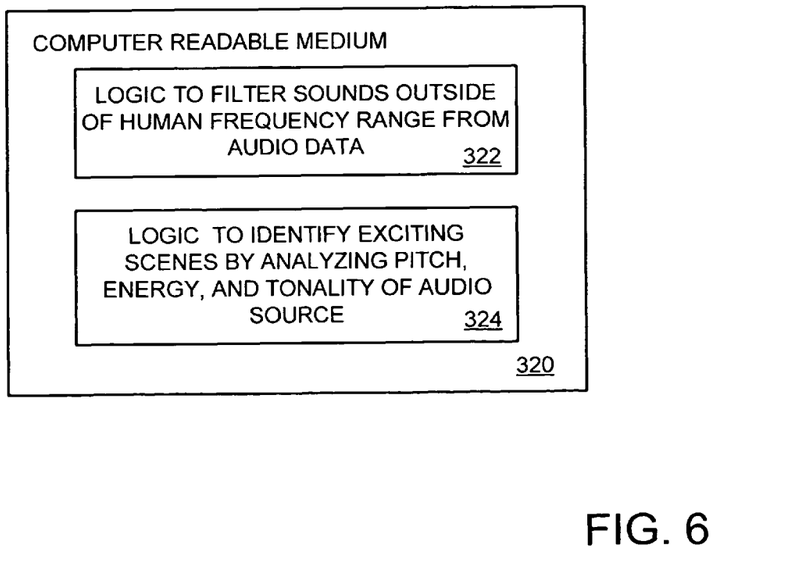
FIG. 6 is a block diagram illustrating an embodiment of a computer readable medium containing a program for identifying exciting scenes in an audio track containing sports content.

FIG. 6 illustrates an embodiment of a computer readable medium for identifying a scene in an audio source containing sports content 320. The computer readable medium 320 includes logic configured to filter sounds from the audio source that fall outside a frequency range of sounds typically produced by humans. As noted above in reference to FIG. 2, non-human sounds can reduce accuracy of analysis and identification of exciting scenes. The computer readable medium 320 further includes logic to identify exciting scenes by analyzing, preferably frame-by-frame, pitch, energy and tonality of each frame to determine whether the frame contains sounds indicative of an exciting scene 324.

Embodiments of the present disclosure can be implemented in hardware, software, firmware, or a combination thereof. Some embodiments can be implemented in software or firmware that is stored in a memory and that is executed by a suitable instruction execution system. If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

A program according to this disclosure that comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of the illustrated embodiments of the present disclosure in logic embodied in hardware or software-configured mediums.

It should be emphasized that the above-described embodiments of the present disclosure, particularly, any illustrated embodiments, are merely possible examples of implementations. Many variations and modifications may be made to the above-described embodiment(s) of the disclosure without departing substantially from the spirit and principles of the disclosure.

Having thus described the invention, at least the following is claimed:

1. In a video source containing sports, a method of identifying a scene, comprising the steps of:
   analyzing, in a computer, tonality of at least one frame of audio data of a video source containing sports content,
   determining whether tonality of the at least one frame indicates that the at least one frame corresponds to an exciting scene of the video source;
   classifying a scene of the video source corresponding to the at least one frame as an exciting scene if tonality of the at least one frame indicates an exciting scene,
   assigning a confidence score based on the analyzing result of the tonality of the at least one frame of the audio data, the confidence score corresponding to whether the at least one frame corresponds to an exciting scene of the video source, and
   creating meta data identifying the exciting scene within the video source, the meta data being created based on the assigned confidence score,
   wherein the likelihood of classifying a scene of the video source corresponding to the at least one frame as an exciting scene increases as the tonality of the at least one frame approaches tonality of a pure tone.

2. The method of claim 1, wherein the step of determining whether the at least one frame corresponds to an exciting scene comprises determining whether the tonality of the at least one frame exceeds a predefined threshold.

3. The method of claim 1, wherein the step of determining whether the at least one frame corresponds to an exciting scene further comprises detecting and analyzing the energy of the at least one frame.

4. The method of claim 1, wherein the step of determining whether the at least one frame corresponds to an exciting scene further comprises detecting and analyzing the pitch of the at least one frame.

5. The method of claim 1, wherein the step of determining whether the at least one frame corresponds to an exciting scene comprises determining whether the confidence score exceeds a predefined threshold.

6. The method of claim 1, further comprising the step of: removing from the audio data sounds that are substantially outside a frequency range of human sound.

7. The method of claim 1, further comprising the step of:
   calculating an average tonality of the at least one frame of the audio data, and determining whether the average tonality of the at least one frame exceeds a predefined threshold.

8. The method of claim 1, further comprising the steps of:
   analyzing a plurality of frames of audio data of the video source containing sports content, the plurality of frames corresponding to a scene of the video source, determining whether the scene of the video source is an exciting scene by determining whether tonality of a ratio of the plurality of frames exceeds a predefined threshold.

9. In an audio source containing sports content, a method of identifying a scene, comprising the steps of:
   analyzing, in a computer, tonality of at least one frame of an audio source containing sports content;
   determining whether tonality of the at least one frame corresponds to an exciting scene of the audio source;
   classifying a scene of the audio source corresponding to the at least one frame as an exciting scene if tonality of the at least one frame indicates an exciting scene, and
   assigning a confidence score based on the analyzing result of the tonality of the at least one frame of the audio data, the confidence score corresponding to whether the at least one frame corresponds to an exciting scene of the video source, and
   creating meta data identifying the exciting scene within the video source, the meta data being created based on the assigned confidence score,
   wherein the likelihood of classifying a scene of the audio source corresponding to the at least one frame as an exciting scene increases as the tonality of the at least one frame approaches tonality of a pure tone.

10. The method of claim 9, wherein the step of determining whether the at least one frame corresponds to an exciting scene comprises determining whether the tonality of the at least one frame exceeds a predefined threshold.

11. The method of claim 10,
    wherein the meta data is created by identifying frames within the audio source having a confidence score above a confidence threshold score.

12. The method of claim 9, further comprising the step of:
    assigning a confidence score based on tonality of the at least one frame of the audio data, wherein the confidence score corresponds to whether the at least the frame corresponds to an exciting scene of the audio source.

13. The method of claim 9, wherein the step of determining whether the at least one frame corresponds to an exciting scene further comprises detecting and analyzing the energy of the at least one frame.

14. The method of claim 9, wherein the step of determining whether the at least one frame corresponds to an exciting scene further comprises detecting and analyzing the pitch of the at least one frame.

15. The method of claim 9, further comprising the step of:
    removing from the audio data sounds that are substantially outside a frequency range of human sound.

16. The method of claim 9, further comprising the step of:
    calculating an average tonality of the at least one frame of the audio data, and determining whether the average tonality of the at least one frame exceeds a predefined threshold.

17. The method of claim 9, further comprising the steps of:
    analyzing a plurality of frames the audio source containing sports content, the plurality of frames corresponding to a scene of the audio source,
    determining whether the scene of the audio source is an exciting scene by determining whether tonality of a ratio of the plurality of frames exceeds a predefined threshold.

18. A non-transitory computer readable medium having a program for identifying a scene in a video source containing sports, comprising:
    logic configured to detect whether tonality of at least one frame of audio data of a video source containing sports content indicates that the at least one frame of the audio data corresponds to an exciting scene of the video source, and
    logic configured to classify the at least one frame of the audio data as an exciting scene if tonality of the at least one frame of the audio data indicates an exciting scene of the video source wherein the logic configured to classify the at least one frame of the audio data as an exciting scene assigns a confidence score to the at least one frame, the confidence score corresponding to whether the at least one frame of the audio data corresponds to an exciting scene of the video source,
    logic configured to generate meta data identifying exciting scenes within the video source, wherein the meta data is created by identifying frames within the audio data having a confidence score above a confidence threshold score.

19. The non-transitory computer readable medium of claim 18, wherein the logic configured to classify the at least one frame of the audio data as an exciting scene determines whether tonality of the at least one frame of the audio data exceeds a predefined threshold.

20. The non-transitory computer readable medium of claim 18, further comprising: logic configured to analyze pitch of the at least one frame, wherein the logic configured to classify the at least one frame as an exciting scene further comprises logic to classify the at least one frame as an exciting scene if the pitch indicates an exciting scene of the video source.

21. The non-transitory computer readable medium of claim 18, further comprising:
logic configured to analyze energy of the at least one frame, wherein the logic configured to classify the at least one frame as an exciting scene further comprises logic to classify the at least one frame as an exciting scene if the energy indicates an exciting scene of the video source.

22. The non-transitory computer readable medium of claim 18, wherein the likelihood of classifying a scene of the audio source corresponding to the at least one frame as an exciting scene increases as the tonality of the at least one frame approaches tonality of a pure tone.

23. The non-transitory computer readable medium of claim 18, further comprising:
logic configured to remove from the audio data sounds that are substantially outside a frequency range of human sound.

24. The non-transitory computer readable medium of claim 18, further comprising:
logic configured to calculate an average tonality of the at least one frame of the audio data,
logic configured to determine whether the average tonality of the at least one frame exceeds a predefined threshold.

25. The non-transitory computer readable medium of claim 18, further comprising:
logic configured to analyze a plurality of frames of audio data of the video source containing sports content, the plurality of frames corresponding to a scene of the video source,
logic configured to determine whether the scene of the video source is an exciting scene by determining whether tonality of a ratio of the plurality of frames exceeds a predefined threshold.

26. The non-transitory A computer readable medium having a program for identifying a scene in an audio source containing sports, comprising:
logic configured to detect whether tonality of at least one frame of audio data of a audio source containing sports content indicates that the at least one frame of the audio data corresponds to an exciting scene of the audio source,
logic configured to classify the at least one frame of the audio data as an exciting scene if tonality of the at least one frame of the audio data indicates an exciting scene of the video source, wherein the logic configured to classify the at least one frame as an exciting scene assigns a confidence score based on tonality of the at least one frame, the confidence score corresponding to the likelihood that the at least one frame corresponds to an exciting scene;
logic configured to generate meta data identifying exciting scenes contained within the audio source, wherein the meta data is generated by determining whether the confidence score of at least one frame exceeds a threshold confidence score.

27. The non-transitory computer readable medium of claim 26, wherein the logic configured to classify the at least one frame as an exciting scene determines whether tonality of the at least one frame exceeds a predefined threshold.

28. The non-transitory computer readable medium of claim 26, wherein the likelihood of classifying a scene of the audio source corresponding to the at least one frame as an exciting scene increases as the tonality of the at least one frame approaches tonality of a pure tone.

29. The non-transitory computer readable medium of claim 26, further comprising:
logic configured to analyze pitch of the at least one frame, wherein the logic configured to classify the at least one frame as an exciting scene further comprises logic to classify the at least one frame as an exciting scene if the pitch indicates an exciting scene of the audio source.

30. The non-transitory computer readable medium of claim 26, further comprising:
logic configured to analyze energy of the at least one frame, wherein the logic configured to classify the at least one frame as an exciting scene further comprises logic to classify the at least one frame as an exciting scene if the energy indicates an exciting scene of the audio source.

31. The non-transitory computer readable medium of claim 26, further comprising:
logic configured to remove from the audio data sounds that are substantially outside a frequency range of human sound.

32. The non-transitory he computer readable medium of claim 26, further comprising:
logic configured to calculate an average tonality of the at least one frame of the audio data,
logic configured to determine whether the average tonality of the at least one frame exceeds a predefined threshold.

33. The non-transitory The computer readable medium of claim 26, further comprising:
logic configured to analyze a plurality of frames of audio data of the audio source containing sports content, the plurality of frames corresponding to a scene of the video source, and
logic configured to determine whether the scene of the video source is an exciting scene by determining whether tonality of a ratio of the plurality of frames exceeds a predefined threshold.

* * * * *